United States Patent
McDearmon et al.

(10) Patent No.: US 6,792,815 B2
(45) Date of Patent: Sep. 21, 2004

(54) MULTIAXIS RING LOAD CELL

(75) Inventors: Graham F. McDearmon, North Canton, OH (US); David R. Leeper, Canton, OH (US); David H. Walter, Carrollton, OH (US); Doug H. Smith, Akron, OH (US)

(73) Assignee: The Timken Company, Canton, OH (US)

( * ) Notice: Subject to any disclaimer, the term of this patent is extended or adjusted under 35 U.S.C. 154(b) by 186 days.

(21) Appl. No.: 10/141,387

(22) Filed: May 8, 2002

(65) Prior Publication Data

US 2003/0209085 A1 Nov. 13, 2003

(51) Int. Cl.[7] .............................................. G01D 7/00
(52) U.S. Cl. ................................................. 73/862.041
(58) Field of Search ..................... 73/862.041, 862.042, 73/862.043, 862.044, 862.045, 862.046, 862.08, 862.338

(56) References Cited

U.S. PATENT DOCUMENTS

| | | | |
|---|---|---|---|
| 3,618,376 A | * 11/1971 | Shull et al. | ............. 73/862.045 |
| 4,079,624 A | 3/1978 | Kurtz | |
| 4,094,192 A | * 6/1978 | Watson et al. | ......... 73/862.044 |
| 4,823,618 A | * 4/1989 | Ramming | .............. 73/862.045 |
| 4,907,168 A | 3/1990 | Boggs | |
| 4,911,024 A | 3/1990 | McMaster | |
| 5,063,788 A | 11/1991 | Ch'Hayder et al. | |
| 5,076,375 A | 12/1991 | Dillon et al. | |
| 5,490,427 A | 2/1996 | Yee et al. | |
| 5,850,044 A | 12/1998 | Spletzer | |
| 5,969,268 A | 10/1999 | Sommerfeld et al. | |
| 6,038,933 A | 3/2000 | Meyer | |
| 6,269,702 B1 | * 8/2001 | Lambson | ............... 73/862.045 |
| 6,295,878 B1 | 10/2001 | Berme | |

* cited by examiner

*Primary Examiner*—Edward Lefkowitz
*Assistant Examiner*—Corey D. Mack
(74) *Attorney, Agent, or Firm*—Polster, Lieder, Woodruff & Lucchesi, L.C.

(57) ABSTRACT

A ring load cell configured to measure force, moment, and temperature components in an orthogonal three-axis coordinate system. The ring-load-cell structure consists of two annular flanges having a common central axis through which a shaft may be disposed. The annular flanges are interconnected by a plurality of filleted posts configured to enhance strain distribution and which are disposed parallel to the common central axis, equally spaced about the circumference of the annular flanges. A plurality of strain gauges is disposed either on the posts or on fillets, and a plurality of temperature sensors is disposed either on the posts or on the inner surfaces of the annular flanges. Signals from the strain gauges and temperature sensors are processed to provide thermally compensated strain measurements of the applied forces and moments on the ring-load-cell structure in the orthogonal three-axis coordinate system.

22 Claims, 7 Drawing Sheets

FIG. 10

MULTIAXIS RING LOAD CELL

CROSS-REFERENCE TO RELATED APPLICATIONS

None.

STATEMENT REGARDING FEDERALLY SPONSORED RESEARCH

Not Applicable.

BACKGROUND OF THE INVENTION

The present invention relates generally to load cells of the type used to measure forces and moments, and more particularly, to a ring load cell configured for placement around an axially disposed shaft to provide thermally compensated force and moment measurements in an orthogonal three-axis coordinate system.

It is frequently necessary to measure applied forces and moments between a motor or gear drive and a shaft driven component. Usually, the forces and moments acting upon such a mechanical system are expressed in terms of a three-dimensional coordinate system, and may be completely expressed in terms of six components, including three linear force components along each of three mutually orthogonal axes and three moments about the same set of axes.

A conventional approach to developing force sensors for measuring these six components is to use mechanical structures including various hinges, pivots, or other mechanisms to decouple the force components and to permit them to be measured independently from one another. Such mechanical structures are complex to manufacture, and require precise accuracy in dimensions and component elasticities to accurately decouple the individual force components. Accordingly, such structures are costly to manufacture and maintain.

An alternative approach which has been developed to overcome some of the problems associated with mechanically decoupling the various forces and moments to be measured is to use strain-based force sensors as is exemplified by U.S. Pat. No. 4,094,192 to Watson, et al. The system disclosed in the U.S. Pat. No. 4,094,192 patent employs shear strain gages and extensional gages mounted on beams disposed between a pair of annular rings to measure forces and moments acting on the ring. Signals from the individual sensors are processed by an analog or digital processor to derive the desired force and moment components in an orthogonal three-axis coordinate system without the need to know the dimensions or elasticities of the structure upon which the sensors are mounted. However, the design shown in the U.S. Pat. No. 4,094,192 patent results in a trade off of gage sensitivity between the shear strain gages and the extensional gages, which are mounted to the same beams.

There is an ongoing need to provide an improved compact multi-axis load cell particularly suited for use about a shaft disposed between a driving component and a driven component, and which can be selectively configured for sensitivity to forces or moments depending upon the particular application in which it is employed.

BRIEF SUMMARY OF THE INVENTION

Briefly stated, the present invention is a ring load cell configured to measure three force components and three moment components in an orthogonal three-axis coordinate system, together with one or more temperature components. The ring-load-cell structure consists of two annular flanges having a common central axis through which a shaft may be disposed. The annular flanges are interconnected by a plurality of filleted posts configured to enhance strain distribution and which are disposed parallel to the common central axis, equally spaced about the circumference of the annular flanges. A plurality of strain gauges is disposed either on the posts or on the fillets, and a plurality of temperature sensors are disposed either on the posts or on the inner surfaces of the annular flanges. Signals from the strain gauges and temperature sensors are processed to provide thermally compensated strain measurements of the applied forces and moments on the ring-load-cell structure in the orthogonal three-axis coordinate system.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
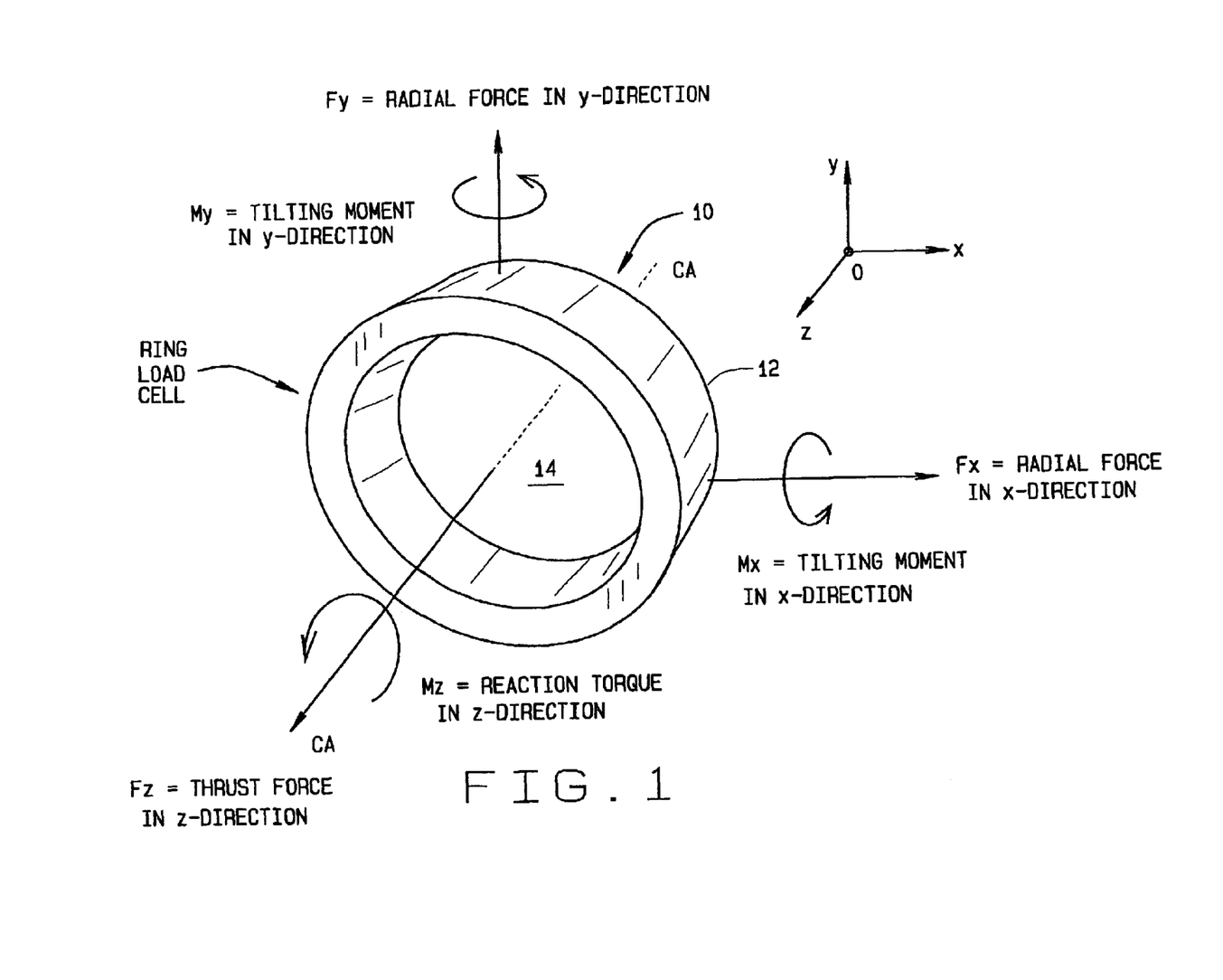
FIG. 1 is a simplified perspective illustration of a ring load cell, illustrating the relationship of force and moment components in an orthogonal three-axis coordinate system.

Turning to FIG. 1, a simplified representation of a multi-axis ring load cell (RLC) of the present invention is indicated generally at 10. The multi-axis RLC 10 comprises an annular structure 12 having a large central opening 14 disposed along a central axis CA through which a shaft or other cylindrical member can pass. Further illustrated in FIG. 1 is a three-axis orthogonal coordinate system having an origin O and three principal axes, designated X, Y, and Z, orientated as shown relative to the multi-axis RLC 10. As will be described below in further detail, the multi-axis RLC 10 is configured to measure radial forces in the X-direction, designated Fx, radial forces in the Y-direction, designated Fy, and thrust forces in the Z-direction, designated Fz. In addition to the force measurements, the multi-axis RLC 10 is further configured to measure the tilting moment in the X-direction, designated Mx, the tilting moment in the Y-direction, designated My, and the reaction torque in the Z-direction, designated Mz.

Figure 2:
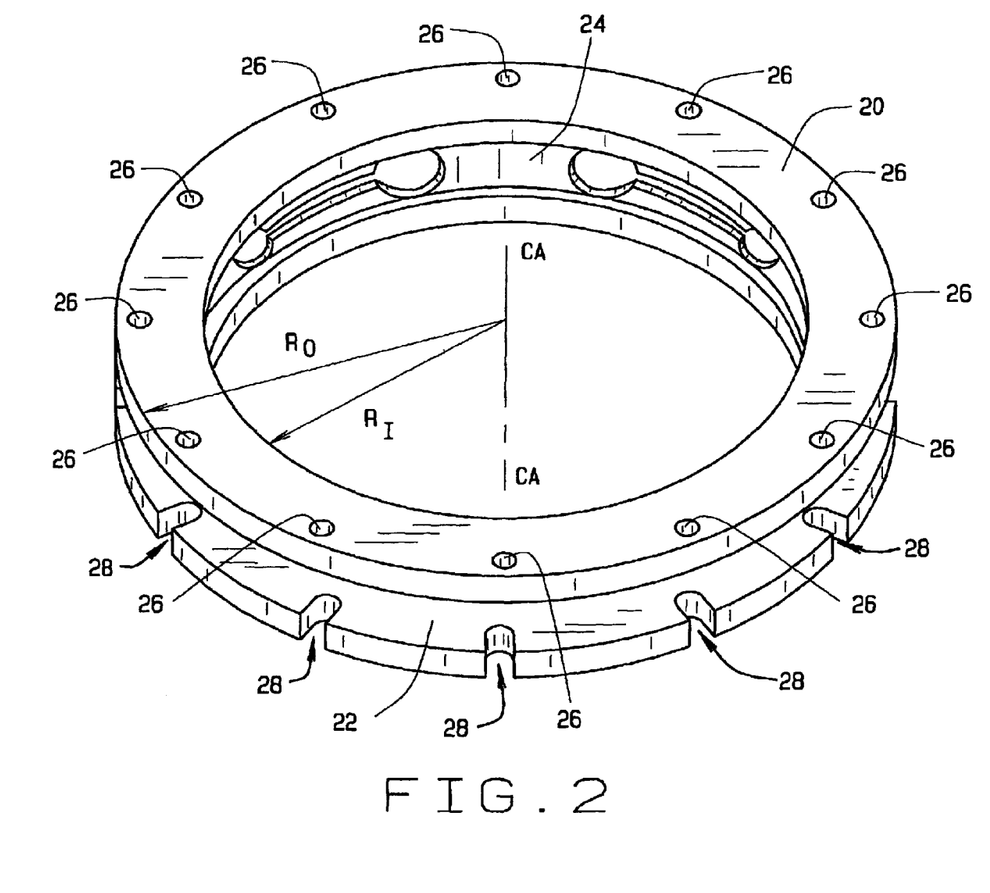
FIG. 2 is a perspective view of a front annular flange in a four-post embodiment of the ring load cell of the present invention.
Figure 3:
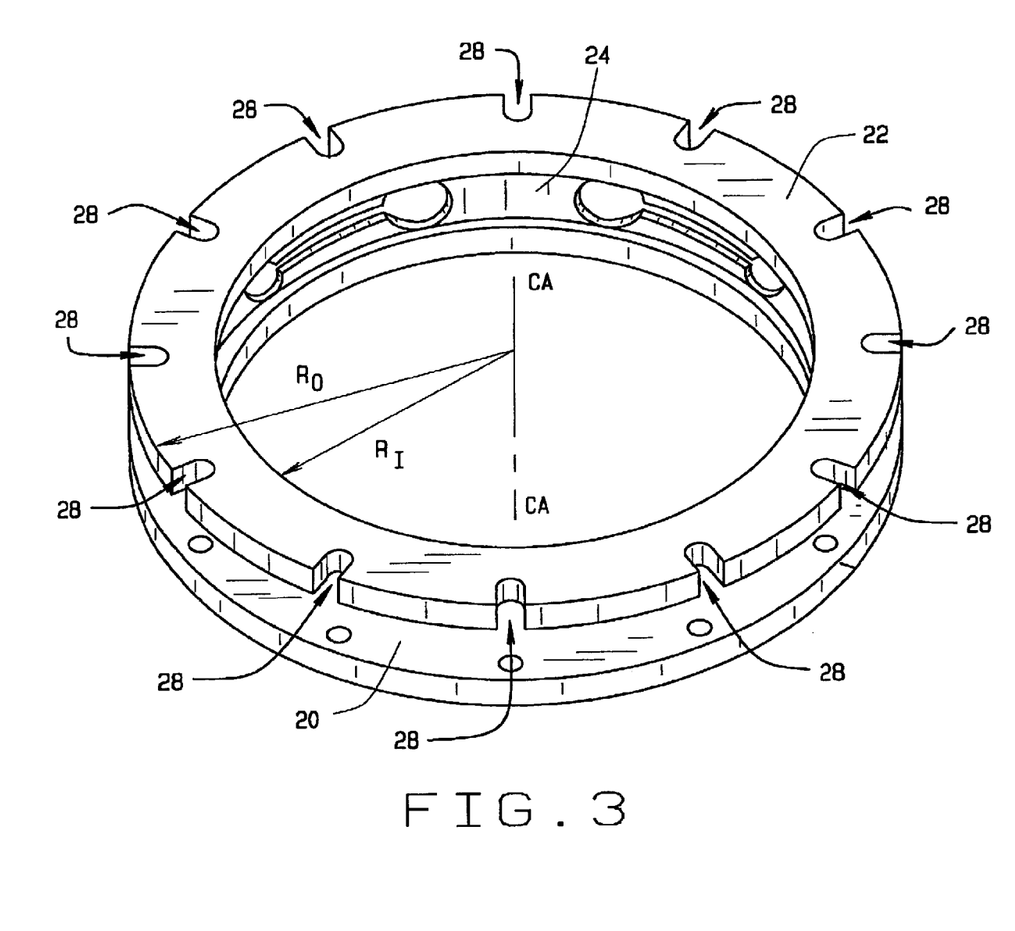
FIG. 3 is a perspective view of a rear annular flange in the four-post embodiment of the ring load cell shown in FIG. 2.
Figure 5A:
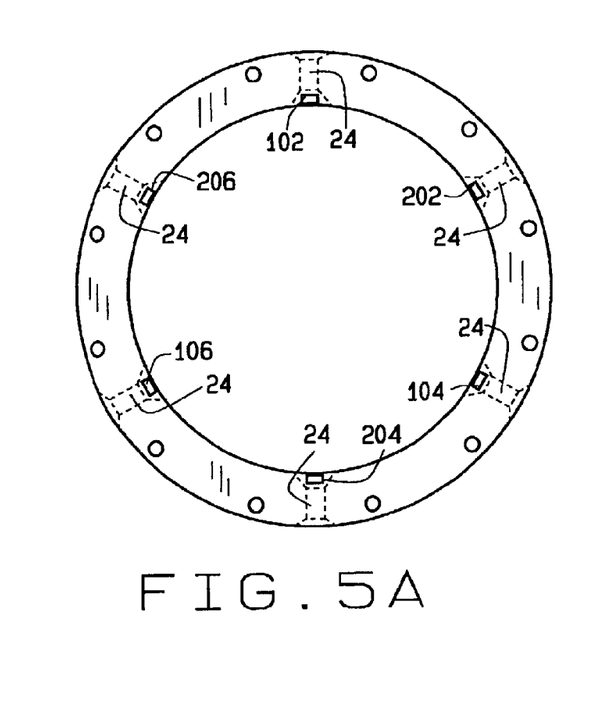
FIGS. 5A–5C illustrate the front view, side sectional view, and rear view of a six-post embodiment of the ring load cell of the present invention.
Figure 5B:
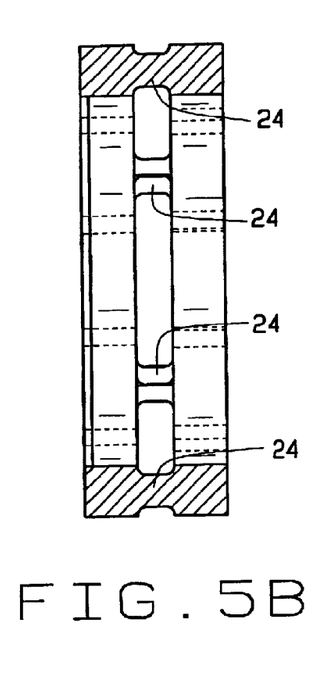
Figure 5C:
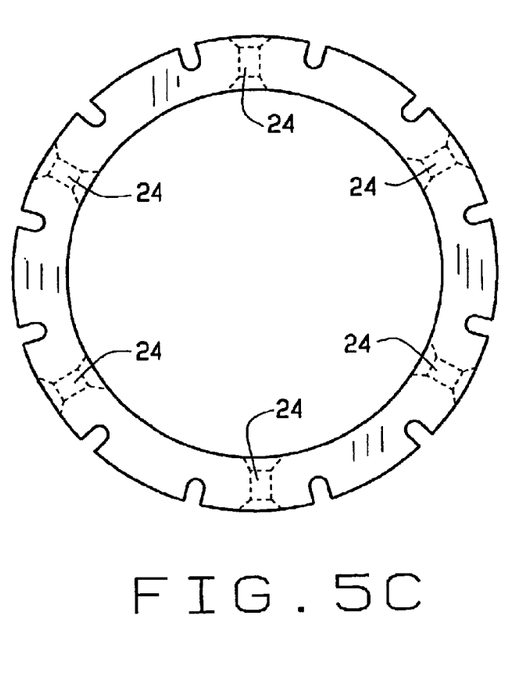
Figure 6A:
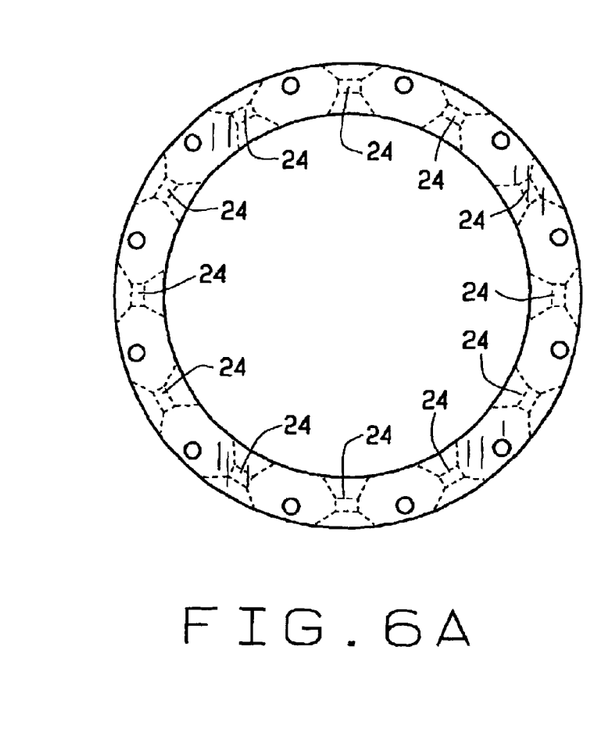
FIGS. 6A–6C illustrate the front view, side sectional view, and rear view of a twelve-post embodiment of the ring load cell of the present invention.
Figure 6B:
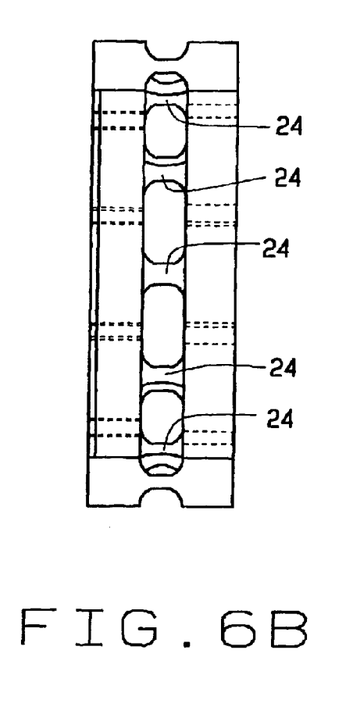
Figure 6C:
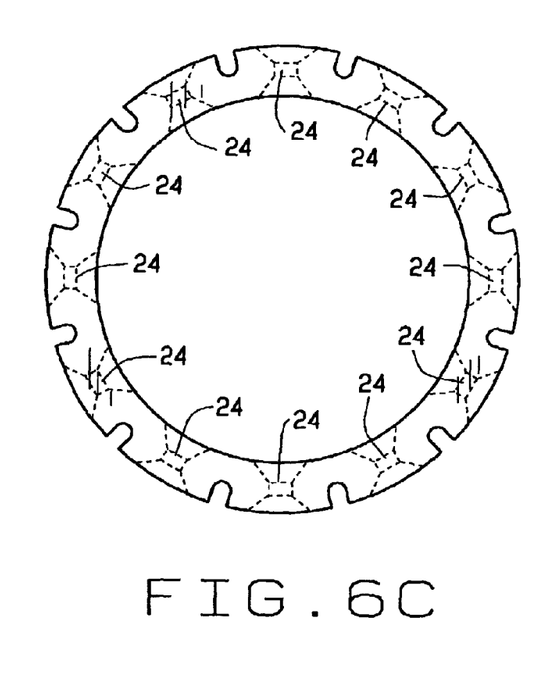

The multi-axis RLC 10 comprises a front annular flange 20 as shown in FIG. 2, and a rear annular flange 22 as shown in FIG. 3, interconnected by a number of equally spaced posts 24. The specific number of equally spaced posts 24 may vary depending upon the particular application for which the multi-axis RLC 10 is configured. In the embodiment shown in FIGS. 2 and 3, four posts 24 are employed, equidistantly spaced on 90-degree centers about the central axis CA at a uniform radius therefrom. Alternate configurations of the multi-axis RLC 10 may employ six posts 24 centered every 60 degrees, as shown in FIGS. 5A–5C, or twelve posts 24 centered every 30 degrees, as shown in FIGS. 6A–6C, which are described below in further detail. Those of ordinary skill in the art will recognize that greater or fewer posts 24, with varied positions, may be employed with the present invention. Posts 24 equidistantly spaced about the central axis CA and at a uniform radius therefrom, are preferred.

The front annular flange 20, the rear annular flange 22, and the interconnecting posts 24 are preferably integrally formed from the single annular structure 12. Alternatively, those of ordinary skill in the art will recognize that the front annular flange 20 and the rear annular flange 22 may be formed from individual annular members, and then interconnected by affixing posts 24 therebetween at the desired circumferential locations and radial distance. Included in the front annular flange 20 and the rear annular flange 22 are a plurality of attachment points such as bores 26 or slots 28, through which bolts or other suitable fixtures (not shown) may be passed to secure the multi-axis RLC 10 to a fixed surface. Those of ordinary skill in the art will recognize that the exact number and placement of the bores 26 and slots 28 may be varied depending upon the particular application for which the multi-axis RLC 10 is to be employed.

Figure 4:
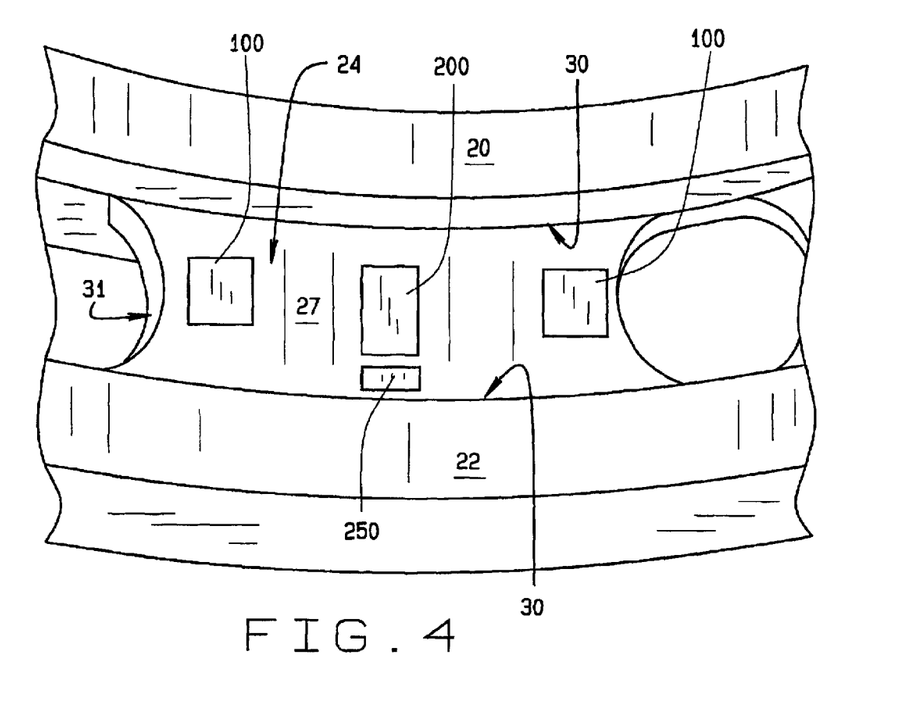
FIG. 4 is an enlarged perspective illustration of a single post interconnecting the front and rear annular flanges of FIGS. 2 and 3.

In the embodiment of the multi-axis RLC 10 shown in FIGS. 2 and 3, four posts 24 are positioned between the front annular flange 20 and the rear annular flange 22, each centered at 90 degree intervals about the central axis CA. FIG. 4 provides an enlarged perspective illustration of one post 24 at a circumferential location designated as 0 degrees about the central axis CA. As can be see in FIG. 4, the post 24 is formed as a cylindrical section, having an inner radial surface 27 and an outer radial surface 29, each of which are concentric with the central axis CA of the multi-axis RLC 10. The radial thickness of the post 24 shown in FIG. 4 is substantially less than the radial thickness of the front annular flange 20 and the rear annular flange 22. Preferably, each post 24 is positioned between the inner radial dimension $R_i$ and outer radial dimension $R_o$, of the annular flanges 20, 22 such that a first portion of the flanges 20, 22 extends radially inward from the posts 24, and a second portion extends radially outward from the posts 24, as seen in FIG. 4. Each post 24 is joined to the front and rear flanges 20, 22 with a uniform radius fillet 30 to provide strength and flexibility at the interconnection regions.

In alternate embodiments of the present invention, such as is shown in FIGS. 5A–5C and 6A–6C, the placement and configuration of the posts 24 may be varied. Posts 24 may be configured with cylindrical surfaces 27, 29 having greater width than radial depth, as seen in FIG. 4, to provide for larger surface areas across which uniform strain is distributed. Alternatively, posts 24 having reduced cylindrical surfaces 27, 29, i.e. posts 24 with a smaller width than radial depth, as seen in FIGS. 5A–5C and 6A–6C, are utilized to provide for a smaller surface area across which a concentrated strain is distributed.

Figure 7:
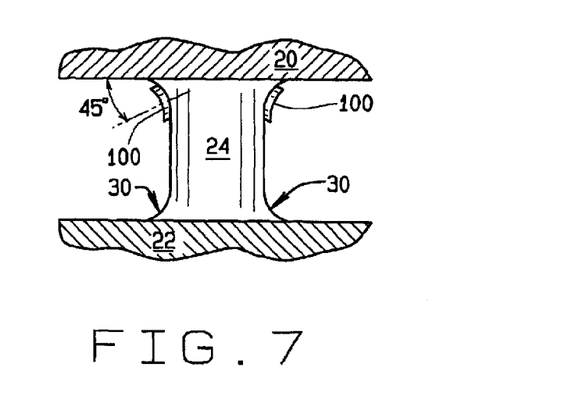
FIG. 7 is a cross-sectional view of a post interconnecting the front and rear annular flanges, illustrating placement locations for strain gages on the uniform radius fillets.

To provide measurements of the force components Fx, Fy, and Fz, as well as the moment components Mx, My, and Mz applied to the multi-axis RLC 10, a plurality of extension gages 100 and shear strain gages 200 are affixed to the structure of the multi-axis RLC 10. The design of the multi-axis RLC 10 is such that forces and moments applied to the multi-axis RLC 10 are conveyed between the front flange 20 and the rear flange 22 through the plurality of posts 24. In the preferred embodiment, the extension gages 100 and shear strain gages 200 are centrally affixed to any surface of the posts 24, or alternatively, are affixed to the surfaces of the uniform radius fillets 30 on the radius centerlines, as shown in FIG. 7. Placement of the extension gages 100 and the shear strain gages 200 is selected such that gages are affixed to locations, and at orientations, in which one form of strain is dominant in the structure of the multi-axis RLC 10, i.e. bending, shear, or extensional strain.

Each extension gage 100 and shear strain gage 200 provides a measurement of the forces acting on the post 24 or fillet 30 to which it is affixed. Using conventional mathematical procedures, the measurements from multiple gages 100, 200 placed at known locations about the multi-axis RLC 10, are utilized to calculate the force components Fx, Fy, and Fz, as well as the moment components Mx, My, and Mz.

In a preferred configuration of the multi-axis RLC 10 utilizing six posts 24, an extension gage 100 is affixed to each of a first set of posts 24, with each post displaced by 120 degrees about the central axis CA. For example, if a first extension gage 102 is affixed to the post 24 designated as the 0 degree post, the second extension gage 104 is affixed to the post 24 designated as the 120 degree post, and the third extension gage 106 is affixed to the post designated as the 240 degree post. Correspondingly, a shear strain gage 200 is affixed to each of a second set of posts 24, with each post displaced by 120 degrees about the central axis CA and circumferentially by 60 degrees from the posts 24 which comprise the first set.

For example, as seen in FIGS. 5A–5C, if the extension gages 102, 104, and 106 are affixed to the posts 24 designated as the 0 degree, 120 degree, and 240 degree posts, then a first shear strain gage 202 is affixed to the post 24 designated as the 60 degree post, the second shear strain gage 204 is affixed to the post 24 designated as the 180 degree post, and the third shear strain gage 206 is affixed to the post designated as the 300 degree post. The placement of the extension gages and the shear strain gages for a multi-axis RLC 10 configured with twelve posts 24 is preferably identical to the placement for a multi-axis RLC 10 configured with six posts 24, leaving a number of posts 24 without a gage affixed thereto. It will be recognized that additional extension gages and shear strain gages may be affixed to alternate sets of posts having the above-described circumferential spacing to provide redundant force measurement capabilities.

In the multi-axis RLC 10, the "bending strain" is measurable in the deflection or bending of the posts 24 in response to forces applied through the front annular flange 20 and the rear annular flange 22. In optional embodiments of the multi-axis RLC 10 employing strain gages to measure bending strain, one or more structural variations may be incorporated to alter the degree to which posts 24 bend or deflect under applied forces.

Figure 8:
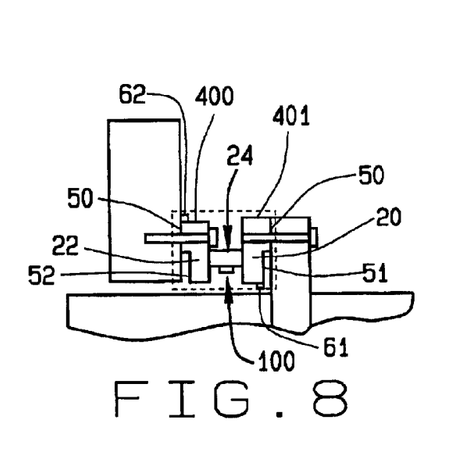
FIG. 8 is a cross-sectional view of the annular structure of a multi-axis ring load cell, illustrating the placement of annular ridges on the exterior surfaces to increase bending strain on each post.

FIG. 8 illustrates a first optional structural variation designed to increase the bending strain on the posts 24 interconnecting the front annular flange 20 and the rear annular flange 22. The inclusion of an annular ridge 50 on the outer surfaces 51, 52 of the respective annular flange 20, 22 increases the bending strain on the posts 24 which is proportional to the distance between the annular ridge 50 radial centerline and the radial centerline of the posts 24. Additional inner and outer radial clearance ridges 61, 62 on the inner or outer radial surface of the annular flanges 20, 22 ensure that the radial motion of the annular flanges 20, 22 is not inhibited by other fixtures.

Figure 9:
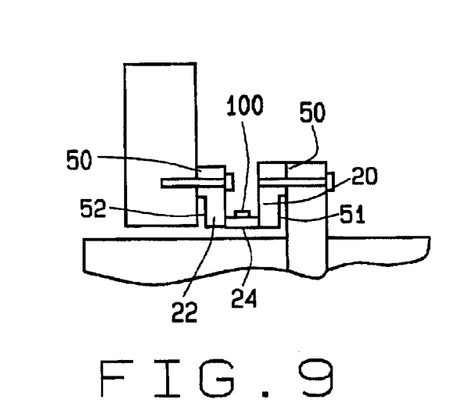
FIG. 9 is a cross-sectional view of the annular structure of a multi-axis ring load cell, illustrating the radial centerline placement of a post 24 in relation to the radial centerline of the front and rear annular flanges.

Correspondingly, the selection of the radial centerline on which posts 24 are positioned about the central axis CA alters the bending strain on the posts. As is seen in FIG. 9, placement of the posts 24 radially inward or radially outward from the annular flange radial centerline results provides a increase in the bending strain exerted on the posts 24 by forces applied to the outer surfaces 52 of the annular flanges 20, 22. Those of ordinary skill in the art will recognize that the inclusion of an annular ridge 50, the selection of the post radial centerline, or both structural variations may be utilized in the design to alter the bending strain on the posts 24, depending upon the particular application for which the multi-axis RLC 10 is to be employed.

Figure 10:
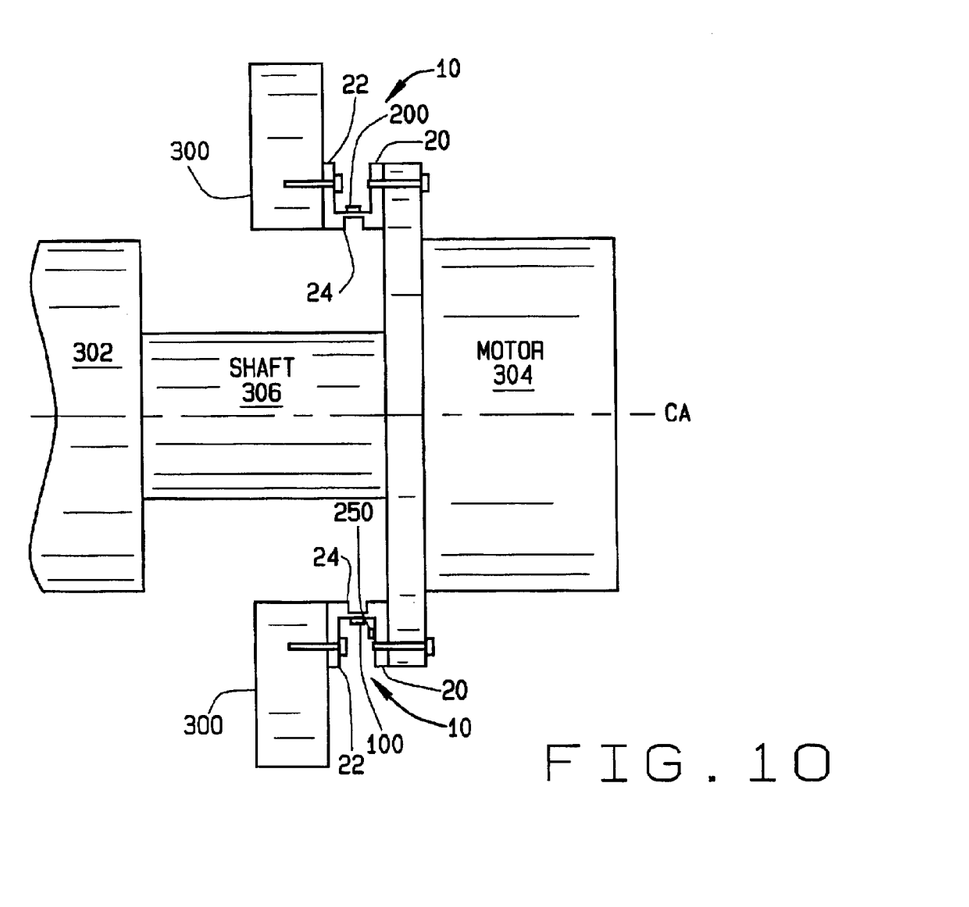
FIG. 10 is a simplified illustration of a multi-axis ring load cell of the present invention affixed about the drive shaft of a drive component.

During use, the multi-axis RLC 10 of the present invention is configured for placement between a drive component 304, such as an electric motor or transmission, and an application fixture 300 receiving a motive force from a driven component 302 and a drive shaft 306 passing through the mutli-axis RLC 10 on the central axis CA, as shown in FIG. 10. The multi-axis RLC 10 is preferably secured in a fixed relationship to the application fixture 300 and the drive component 304 by means of removable bolts passed through a plurality of the bores 26 in the front annular flange 20 and slots 28 in the rear annular flange 22. When affixed between the components 300 and 304, forces acting on the separate components will be transferred through the posts 24, which provide a fixed connection there between, and are measured by the individual gages 100 and 200. Those of ordinary skill in the art will recognize that a variety of methods for fixed attachment of the multi-axis RLC 10 between the drive component 304 and application fixture 300 may be employed, such that forces acting on the components 300, 304 will be transferred through the multi-axis RLC 10.

Measurements of the force and moment components acting on the multi-axis RLC 10 are obtained from the individual gages 100, 200 placed throughout the annular structure 12. In one embodiment, one or more measurements of the temperature of annular structure 12 are obtained from the one or more thermal sensors 250 affixed to the multi-axis RLC 10. Temperature measurements are utilized in subsequent processing to compensate for thermal effects on strain gages and to provide information related to the temperature of the multi-axis RLC 10 operating environment.

In an exemplary application, a drive motor or gear drive 304 is suspended from the application fixture 300 by a multi-axis RLC 10 secured there between. A drive shaft 306 from the drive motor or gear drive 304 passes through the multi-axis RLC 10 on the central axis CA, and provides a motive force to the driven component 302. Measurements of the reaction torque Mz exerted on the multi-axis RLC 10 are equal to, and opposite in direction to, the shaft torque of the drive motor or gear drive 304 exerted on the driven component 302 through the drive shaft 306, providing an inexpensive way to measure shaft torque Mz for a specific drive configuration.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A multi-axis ring load cell comprising:
   a first annular member having a central axis;
   a second annular member disposed coaxial with said first annular member central axis;
   a plurality of posts interconnecting said first and second annular members, said plurality of posts each having a uniform thickness, disposed parallel to said central axis and spaced equidistantly about said central axis;
   a plurality of shear strain gages disposed on a first set of said plurality of posts, said plurality of shear strain gages disposed on said plurality of posts at locations in which shear strain is a dominant strain;
   a plurality of extension gages disposed on a second set of said plurality of posts, said plurality of extension gages disposed on said plurality of posts in locations in which extensional strain is a dominant strain; and
   wherein said first set of posts differs from said second set of posts.

2. The multi-axis ring load cell of claim 1 wherein said plurality of posts interconnecting said first and second annular members consists of four posts disposed parallel to said central axis.

3. The multi-axis ring load cell of claim 1 wherein said plurality of posts interconnecting said first and second annular members consists of six posts disposed parallel to said central axis.

4. The multi-axis ring load cell of claim 1 wherein said plurality of posts interconnecting said first and second annular members consists of twelve posts disposed parallel to said central axis.

5. The multi-axis ring load cell of claim 1 wherein said first set of said plurality of posts consists of three posts spaced at intervals of 120 degrees about central axis; and
   wherein said second set of said plurality of posts consists of three posts spaced at intervals of 120 degrees about said central axis, and displaced 60 degrees about said central axis from said first set of posts.

6. The multi-axis ring load cell of claim 1 wherein said first and second annular members each have an inner diameter, said inner diameter of said first annular member equal to said inner diameter of said second annular member.

7. The multi-axis ring load cell of claim 1 wherein each of said plurality of said posts is filleted at said first annular member and at said second annular member.

8. The multi-axis ring load cell of claim 1 further including at least one temperature sensor disposed on one of said plurality of posts, said first annular member, and said second annular member.

9. The multi-axis ring load cell of claim 8 wherein
   each of said plurality of shear strain gages produces an output signal representative thereof;
   each of said plurality of extension strain gages produces an output signal representative thereof; and
   said at least one temperature sensor produces an output signal representative thereof.

10. The multi-axis ring load cell of claim 9 wherein said at least one temperature sensor output signal is utilized to compensate said shear strain gage output signals and said extension strain gage output signals for thermal effects.

11. The multi-axis ring load cell of claim 1 wherein said first annular member and said second annular member each define an annular sector having an inner radius from said central axis and an outer radius from said central axis.

12. The multi-axis ring load cell of claim 11 wherein each of said plurality of posts interconnect said first annular member and said second annular member at a predetermined radius between said inner radius and said outer radius.

13. The multi-axis ring load cell of claim 11 wherein said annular sector has a radial centerline, and each of said plurality of posts interconnect said first annular member and said second annular member at said radial centerline.

14. The multi-axis ring load cell of claim 11 wherein said annular sector has a radial centerline, and each of said plurality of posts interconnect said first annular member and said second annular member at radial locations displaced from said radial centerline.

15. The multi-axis ring load cell of claim 1 wherein said first annular member and said second annular member each include at least one annular component attachment ridge on an outer surface, each of said component attachment annular ridges radially offset from said plurality of posts.

16. The multi-axis ring load cell of claim 1 wherein said first annular member and said second annular member each include at least one radial clearance ridge on at least one radial surface thereof.

17. The multi-axis ring load cell of claim 1 wherein said first annular member, said second annular member, and said plurality of posts are integrally formed from a single annular structure.

18. The multi-axis ring load cell of claim 1 wherein each of said plurality of posts includes at least one flat surface.

19. A multi-axis ring load cell comprising:
   first and second parallel annular members coaxially disposed about a central axis;
   a plurality of posts interconnecting adjacent inner faces of said first and second annular members, said plurality of posts each having a uniform thickness and spaced equidistantly about said central axis at a first radius;
   a component attachment annular ridge disposed on an outer face of said first and second annular members, each component attachment annular ridge disposed at a second radius offset from said first radius;
   a plurality of shear strain gages disposed on a first set of said plurality of posts;
   a plurality of extension gages disposed on a second set of said plurality of posts; and
   wherein said first set of posts differs from said second set of posts.

20. The multi-axis ring load cell of claim 19 including a first plurality of mounting elements formed in one of the set of said first annular member and said second annular member, and a second plurality of mounting elements formed in an opposite annular member.

21. The multi-axis ring load cell of claim 20 wherein each mounting element of said first plurality of mounting elements forms a bore, said first plurality of mounting elements disposed about a circumference and each having an axis parallel to said central axis.

22. The multi-axis ring load cell of claim 20 wherein each mounting element of said second plurality of mounting elements forms a slot recessed into an outer circumference of said opposite annular member, said second plurality of mounting elements disposed about said outer circumference.

* * * * *